US012530952B2

(12) United States Patent
Jung

(10) Patent No.: US 12,530,952 B2
(45) Date of Patent: Jan. 20, 2026

(54) FIRE DETECTION APPARATUS USING MULTIPLE SENSORS AND OPERATING METHOD THEREOF

(71) Applicant: MSOLUTION CO., LTD., Cheongju-si (KR)

(72) Inventor: Hee Sub Jung, Cheongju-si (KR)

(73) Assignee: MSOLUTION CO., LTD., Cheongju-si (KR)

( * ) Notice: Subject to any disclaimer, the term of this patent is extended or adjusted under 35 U.S.C. 154(b) by 425 days.

(21) Appl. No.: 18/207,101

(22) Filed: Jun. 7, 2023

(65) Prior Publication Data

US 2024/0169814 A1 May 23, 2024

(30) Foreign Application Priority Data

Nov. 22, 2022 (KR) ........................ 10-2022-0157154

(51) Int. Cl.

| | |
|---|---|
| ***G08B 17/02*** | (2006.01) |
| ***G01K 1/02*** | (2021.01) |
| ***G01K 1/024*** | (2021.01) |
| ***G08B 17/11*** | (2006.01) |
| ***G08C 17/00*** | (2006.01) |

(52) U.S. Cl.

CPC ............ *G08B 17/02* (2013.01); *G01K 1/024* (2013.01); *G01K 1/026* (2013.01); *G08B 17/11* (2013.01); *G08C 17/00* (2013.01); *G08C 2200/00* (2013.01)

(58) Field of Classification Search

CPC ........ G08B 17/06; G08B 17/11; G08B 17/10; G08B 17/00; G08B 17/117; G08B 17/125

See application file for complete search history.

(56) References Cited

U.S. PATENT DOCUMENTS

| | | | | |
|---|---|---|---|---|
| 2018/0073982 | A1* | 3/2018 | Ebata | G01N 21/53 |
| 2019/0304280 | A1* | 10/2019 | Bajaj | G08B 17/10 |
| 2021/0350684 | A1* | 11/2021 | Nagashima | G08B 29/188 |
| 2022/0076552 | A1* | 3/2022 | Kim | G06F 18/22 |

FOREIGN PATENT DOCUMENTS

| | | | |
|---|---|---|---|
| KR | 10-2013-0094097 | A | 8/2013 |
| KR | 10-1412624 | B1 | 6/2014 |
| KR | 10-2164865 | B1 | 10/2020 |
| KR | 10-2175292 | B1 | 11/2020 |
| KR | 10-2217219 | B1 | 2/2021 |
| KR | 10-2343555 | B1 | 12/2021 |

* cited by examiner

*Primary Examiner* — Mirza F Alam

(74) *Attorney, Agent, or Firm* — Park, Kim & Suh, LLC

(57) ABSTRACT

Disclosed are a fire detection apparatus and an operating method thereof. The present invention relates to a fire detection apparatus and an operating method thereof, which can detect a fire which occurs in an indoor space by using multiple sensors such as a temperature sensor and a smoke sensor.

11 Claims, 3 Drawing Sheets

FIRE DETECTION APPARATUS USING MULTIPLE SENSORS AND OPERATING METHOD THEREOF

CROSS-REFERENCE TO RELATED APPLICATIONS

This application claims priority to and the benefit of Korean Patent Application No. 10-2022-0157154 filed in the Korean Intellectual Property Office on Nov. 22, 2022, the entire contents of which are incorporated herein by reference.

TECHNICAL FIELD

The present invention relates to a fire detection apparatus using multiple sensors and an operating method thereof.

BACKGROUND ART

In recent years, fires have emerged as a social problem. In particular, when a fire occurs in the indoor space, the proliferation of the fire may cause things that exist in the indoor space due to the proliferation of the fire.

Thus, when the fire occurs in the indoor space, an efficient plan is needed for an initial response to the fire.

In this regard, in the related art, a CCTV was used to identify fire and fire occurrence in the indoor space, but this method has a limit in promptly determining the fire in that it is difficult for managers to monitor there CCTV at all times.

On the other hand, in recent years, due to the development of technology, various sensors such as a temperature sensor and a smoke sensor are being released, and if these sensors can be used, it will be able to be more rapidly and efficiently whether the fire occurs in the indoor space.

Therefore, research on fire detection technologies that support detecting the fire by using multiple sensors such as the temperature sensor and the smoke sensor is required.

SUMMARY OF THE INVENTION

The present invention has been made in an effort to provide a fire detection apparatus and an operating method thereof, which can detect a fire which occurs in an indoor space by using multiple sensors such as a temperature sensor and a smoke sensor to support preventing the fire which occurs in the indoor space from spreading into a large fire.

An exemplary embodiment of the present invention provides a fire detection apparatus including a temperature fuse designed to be disconnected when a temperature exceeds a predetermined reference temperature, a temperature sensor detecting the temperature and generating a temperature measurement value, a first smoke sensor detecting a smoke and generating a notification signal when a current smoke concentration exceeds a predetermined smoke concentration threshold, and a second smoke sensor detecting the smoke and generating the smoke concentration measurement value, which includes: a notification event generating unit generating a fire occurrence notification event for notifying a fire occurrence fact when it is confirmed that the disconnection of the temperature fuse is detected or the notification signal is generated through the first smoke sensor; a first output unit outputting a first indication signal for announcing a fire warning through a signal indicator previously provided in the fire detection apparatus when the fire occurrence notification event is generated; and a composite transmission unit collecting a first temperature measurement value currently measured through the temperature sensor and a first smoke concentration measurement value currently measured through the second smoke sensor, generating a fire occurrence warning message for warning that the fire occurs, and then transmitting the first temperature measurement value, the first smoke concentration measurement value, and the fire occurrence warning message to a predetermined control system connected to the fire detection apparatus through a network, when the first indication signal is output through the signal indicator.

Another exemplary embodiment of the present invention provides an operating method of a fire detection apparatus including a temperature fuse designed to be disconnected when a temperature exceeds a predetermined reference temperature, a temperature sensor detecting the temperature and generating a temperature measurement value, a first smoke sensor detecting a smoke and generating a notification signal when a current smoke concentration exceeds a predetermined smoke concentration threshold, and a second smoke sensor detecting the smoke and generating the smoke concentration measurement value, which includes: generating a fire occurrence notification event for notifying a fire occurrence fact when it is confirmed that the disconnection of the temperature fuse is detected or the notification signal is generated through the first smoke sensor; outputting a first indication signal for announcing a fire warning through a signal indicator previously provided in the fire detection apparatus when the fire occurrence notification event is generated; and collecting a first temperature measurement value currently measured through the temperature sensor and a first smoke concentration measurement value currently measured through the second smoke sensor, generating a fire occurrence warning message for warning that the fire occurs, and then transmitting the first temperature measurement value, the first smoke concentration measurement value, and the fire occurrence warning message to a predetermined control system connected to the fire detection apparatus through a network, when the first indication signal is output through the signal indicator.

A fire detection apparatus and an operating method thereof, which can detect a fire which occurs in an indoor space by using multiple sensors such as a temperature sensor and a smoke sensor are provided to prevent the fire which occurs in the indoor space from spreading into a large fire.

DETAILED DESCRIPTION

Figure 1:
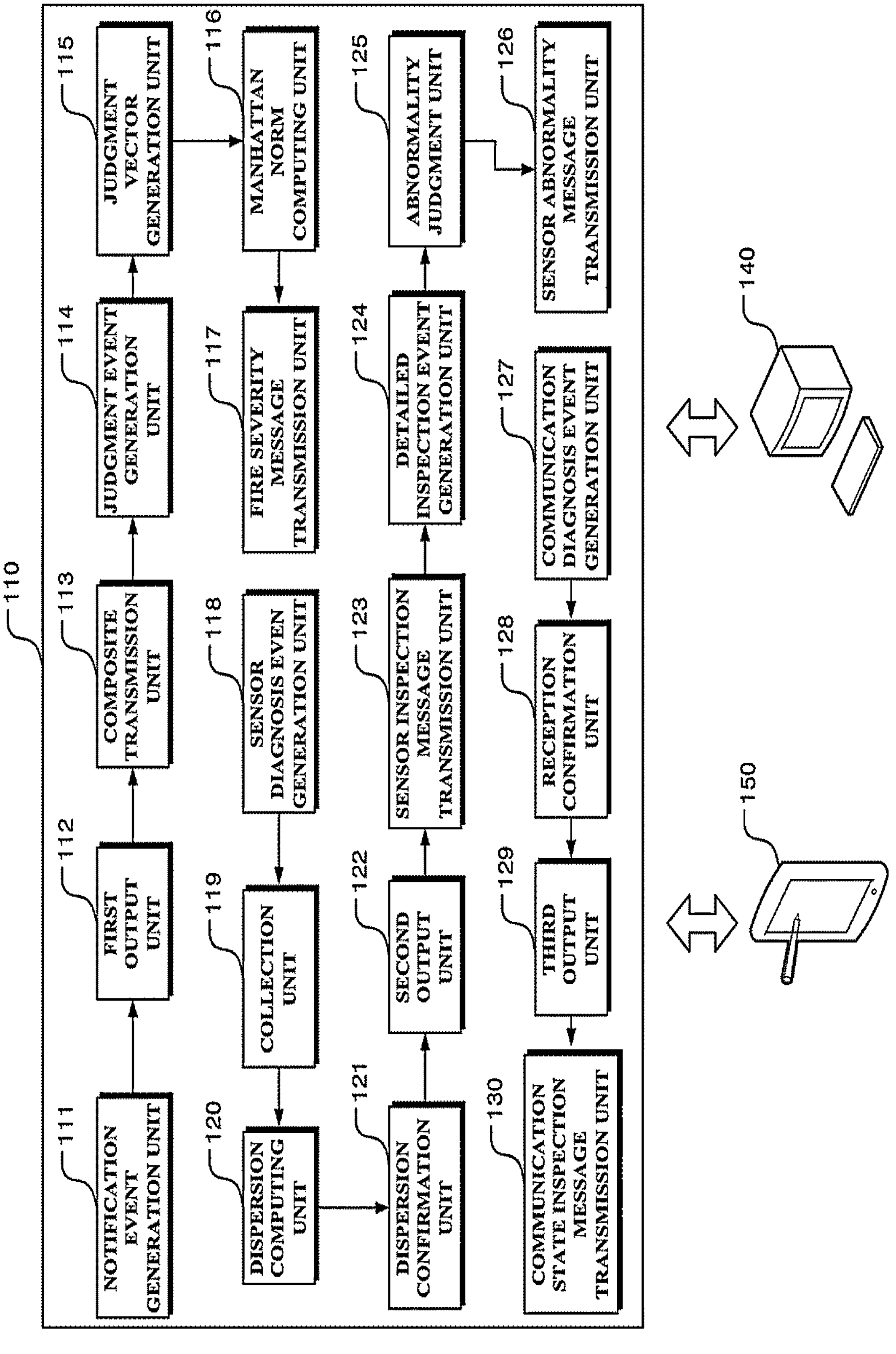
FIG. 1 is a diagram illustrating a structure of a fire detection apparatus using multiple sensors according to an exemplary embodiment of the present invention.

Hereinafter, exemplary embodiments of the present invention will be described in detail with reference to the accompanying drawings. The description does not limit the present invention to specific exemplary embodiments, and it should be understood that the present invention covers all the modifications, equivalents and replacements included within the idea and technical scope of the present invention.

In describing each drawing, like reference numerals refer to like elements and if not contrarily defined, all terms used herein including technological or scientific terms have the same meanings as those generally understood by a person with ordinary skill in the art.

In the present invention, unless explicitly described to the contrary, the word "comprise" and variations such as "comprises" or "comprising", will be understood to imply the inclusion of stated elements but not the exclusion of any other elements. In addition, in various exemplary embodiments of the present invention, respective components, function blocks, or means can be constituted by one or more lower components, and the electricity, electronic, and mechanical functions performed by each component, and can be implemented in various known elements or mechanical elements such as electronic circuits, integrated circuits, ASIC (Application Special Integrated Circuit), and may be implemented separately or two or more may be implemented to be united in one.

On the other hand, the blocks of the attached block diagrams or flow chart can be interpreted as meaning computer program instructions specified functions that are installed in the processor or memory of the data processing-capable equipment such as general-purpose computers, special computers, portable notebook computers, and network computers. Since these computer program instructions can be stored in a memory provided in a computer device or a memory readable on a computer device, the functions described in the blocks of the block diagram or the steps of the flowchart may be produced as a manufacturing product that contains the command means to perform the functions. In addition, each block or each step may indicate a part of a module, segment or code comprising one or more executable instructions for executing a specific logical function(s). In addition, some replaceable exemplary embodiments should be noted that the functions mentioned in the blocks or steps are possible, unlike the determined order. For example, the two blocks or steps shown in one subsequently may be performed simultaneously or in reverse order, and in some cases, some blocks or steps may be omitted.

FIG. 1 is a diagram illustrating a structure of a fire detection apparatus using multiple sensors according to an exemplary embodiment of the present invention.

The fire detection apparatus 110 according to the present invention includes a notification event generation unit 111, a first output unit 112, and a composite transmission unit 113.

In this case, the fire detection apparatus 110 according to the present invention may include a temperature fuse (not illustrated) designed to be disconnected when a temperature exceeds a predetermined reference temperature, a temperature sensor (not illustrated) detecting the temperature and generating a temperature measurement value, a first smoke sensor (not illustrated) detecting a smoke and generating a notification signal when a current smoke concentration exceeds a predetermined smoke concentration threshold, and a second smoke sensor (not illustrated) detecting the smoke and generating the smoke concentration measurement value.

For example, if the predetermined reference temperature is '60 degrees Celsius' and the predetermined smoke concentration threshold is '21 $mg/m^3$', in the fire detection apparatus 110 the temperature fuse designed to be disconnected when the temperature exceeds '60 degrees Celsius' which is the predetermined reference temperature, and the temperature sensor detecting the temperature and generating the temperature measurement value may be provided, and simultaneously, the first smoke sensor detecting a smoke and generating a notification signal when the current smoke concentration exceeds '21 $mg/m^3$' which is the predetermined smoke concentration threshold, and the second smoke sensor detecting the smoke and generating the smoke concentration measurement value.

In such a situation, when it is confirmed that the disconnection of the temperature fuse is detected or the notification signal is generated through the first smoke sensor, the notification event generation unit 111 generates a fire occurrence notification event for notifying a fire occurrence fact.

When the fire occurrence notification event is generated, the first output unit 112 output a first indication signal for announcing a fire warning through a signal indicator previously provided in the fire detection apparatus 110.

Figure 2:
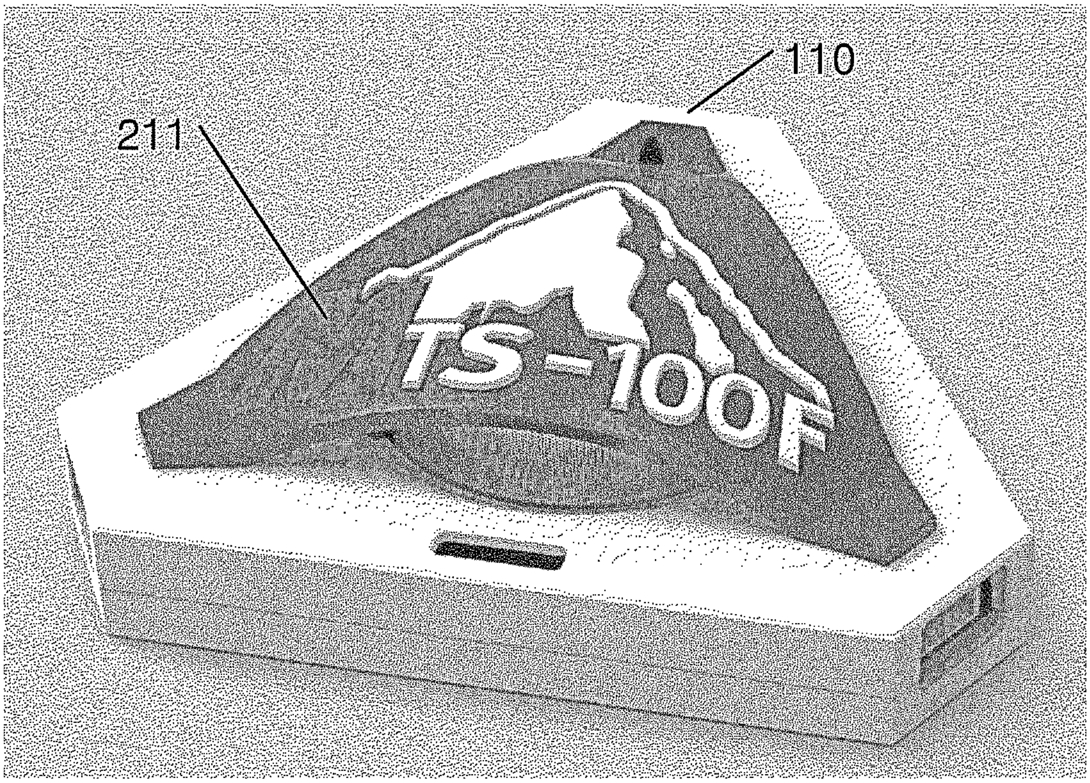
FIG. 2 is a diagram for describing the fire detection apparatus using multiple sensors according to an exemplary embodiment of the present invention.

In this case, according to an exemplary embodiment of the present invention, the signal indicator may be provided in the fire detection apparatus 110 in a form of a light emitting diode (LED) module as illustrated in FIG. 2.

When the first indication signal is output through the signal indicator, the composite transmission unit 113 collects a first temperature measurement value currently measured through the temperature sensor and a first smoke concentration measurement value currently measured through the second smoke sensor, generates a fire occurrence warning message for warning that the fire occurs, and then transmits the first temperature measurement value, the first smoke concentration measurement value, and the fire occurrence warning message to a predetermined control system 140 connected to the fire detection apparatus 110 through a network.

Hereinafter, referring to FIGS. 1 and 2, the operations of the notification event generation unit 111, the first output unit 112, and the composite transmission unit 113 will be described in detail.

First, when it is confirmed that the disconnection of the temperature fuse is detected or the notification signal is generated through the first smoke sensor, the notification event generation unit 111 may generate the fire occurrence notification event for notifying the fire occurrence fact.

As such, when the notification event generation unit 111 generates the fire occurrence notification event, the first output unit 112 may output a first indication signal for announcing the fire warning through a signal indicator 211 previously provided in the fire detection apparatus 110.

Here, when it is assumed that the first indication signal for announcing the fire warning is a 'red signal', the first output unit 112 flashes an LED module constituting the signal indicator 211 to output the 'red signal' which is the first indication signal for announcing the fire warning.

As such, when the 'red signal' is output through the signal indicator 211, the composite transmission unit 113 may collect the first temperature measurement value currently measured through the temperature sensor and the first smoke concentration measurement value currently measured through the second smoke sensor.

When it is assumed that the first temperature measurement value collected by the composite transmission unit 113 is '71 degrees Celsius' and the first smoke concentration measurement value collected by the composite transmission unit 113 is '25.5 $mg/m^3$', the composite transmission unit 113 may generate the fire occurrence warning message for warning that the fire occurs, and then transmit '71 degrees Celsius' which is the first temperature measurement value, '25.5 $mg/m^3$' which is the first smoke concentration measurement value, and the fire occurrence warning message to the predetermined control system 140 connected to the fire detection apparatus 110 through the network.

In this case, when '71 degrees Celsius' which is the first temperature measurement value, '25.5 mg/$m^3$' which is the first smoke concentration measurement value, and the fire occurrence warning message are received, the control system 140 may display the information through a display previously mounted on the control system 140.

Through this, the administrator may confirm '71 degrees Celsius' which is the first temperature measurement value, '25.5 mg/$m^3$' which is the first smoke concentration measurement value, and the fire occurrence warning message through the display.

According to an exemplary embodiment of the present invention, the fire detection apparatus 110 may further include a judgment event generation unit 114, a judgment vector generation unit 115, a Manhattan norm computing unit 116, and a fire severity message transmission unit 117.

When the first temperature measurement value, the first smoke concentration measurement value, and the fire occurrence warning message are transmitted to the control system 140 through the composite transmission unit 113, the judgment event generation unit 114 generates a fire severity judgment event for judging a fire severity.

When the fire severity judgment event is generated, the judgment vector generation unit 115 generates a 3-dimensional judgment vector constituted by a first component (the first component is a component which is designated to a predesignated first numerical value and when the disconnection of the temperature fuse is detected and '0' when the disconnection of the temperature fuse is not detected) for indicating whether the disconnection of the temperature fuse is detected, a second component (the second component is a component which is designated to a predesignated second numerical value when the notification signal is generated and '0' when the notification signal is not generated) for indicating whether the notification signal is generated, and a third component (the third component is a component which is designated to a predesignated third numerical value when the disconnection of the temperature fuse is detected and simultaneously, the notification signal is generated and '0' when the disconnection of the temperature fuse is not detected or the notification signal is not generated) for indicating whether the disconnection of the temperature fuse is detected and simultaneously, whether the notification signal is generated.

For example, when the first numerical value '2', the second numerical value '1', and the third numerical value is '3', the judgment vector generation unit 115 may generate a judgment vector shown in Table 1 below according to a condition related to whether the disconnection of the temperature fuse is detected, the notification signal is generated, etc.

TABLE 1

| Condition | Judgment vector |
|---|---|
| Whether disconnection of temperature fuse is detected: detected<br>Whether notification signal is generated: generated | [2 1 3] |
| Whether disconnection of temperature fuse is detected: detected<br>Whether notification signal is generated: not generated | [2 0 0] |
| Whether disconnection of temperature fuse is detected: not detected<br>Whether notification signal is generated: generated | [0 1 0] |

When the judgment vector is generated, Manhattan norm computing unit 116 the Manhattan norm of the judgment vector is computed.

Here, the Manhattan norm as an L1 norm representing a size of a vector or a matrix may be computed according to Equation 1 below.

$$\|X\|_1 = \sum_{i=1}^{n} |x_i| \quad \text{[Equation 1]}$$

In Equation 1, $\|x\|_1$ means the Manhattan norm and xi means an i-th component included in the vector or matrix.

The fire severity message transmission unit 117 generates a first fire severity message indicting that the fire severity is 'high' and transmits the first fire severity message to the control system 140 when the Manhattan norm of the judgment vector matches a predetermined first reference value indicating that the fire severity is 'high', generates a second fire severity message indicating that the fire severity is 'normal' and transmits the second fire severity message to the control system 140 when the Manhattan norm of the judgment vector matches a predetermined second reference value indicating that the fire severity is 'normal', and generates a third fire severity message indicating that the fire severity is 'low' and transmits the third fire severity message to the control system 140 when the Manhattan norm of the judgment vector matches a predetermined third reference value indicating that the fire severity is 'low'.

In this regard, through the judgment vector generation unit 115, when a generatable condition-specific judgment vector is shown in Table 1 above, the first reference value indicating that the fire severity is 'high' may be designated to '6', when the second reference value indicating that the fire severity is 'normal' may be designated to '2', and the third reference value indicating that the fire severity is 'low' may be designated to '1'.

Hereinafter, the operations of the judgment event generation unit 114, the judgment vector generation unit 115, the Manhattan norm computing unit 116, and the fire severity message transmission unit 117 will be described in detail, for example.

First, as in the above-described example, it is assumed that '71 degrees Celsius' which is the first temperature measurement value, '25.5 mg/$m^3$' which is the first smoke concentration measurement value, and the fire occurrence warning message are transmitted to the control system 140 through the composite transmission unit 113.

However, the judgment event generation unit 114 may generate the fire severity judgment event for judging the fire severity.

As such, when the judgment event generation unit 114 generates the fire severity judgment event, the judgment vector generation unit 115 may generate the 3-dimensional judgment vector constituted by the first component for indicating whether the disconnection of the temperature fuse is detected, the second component for indicating whether the notification signal is generated, and the third component for indicating whether the disconnection of the temperature fuse is detected and simultaneously, the notification signal is generated.

When it is assumed that a current situation is a situation in which the disconnection of the temperature fuse is detected and simultaneously, the notification signal is generated, and the first numerical value is '2', the second numerical value is '1', and the third numerical value is '3', the judgment vector generation unit 115 may generate the 3-dimensional judgment vector as '[2 1 3]'.

As such, when the judgment vector generation unit 115 generates the judgment vector, the Manhattan norm computing unit 116 may compute the Manhattan norm of '[2 1 3]' which is the judgment vector as '6' according to Equation 1 above.

Here, when it is assumed that the predetermined first reference value indicating that the fire severity is 'high' is '6', '6' which is the Manhattan norm of the judgment vector matches '6' which is the first reference value, so the fire severity message transmission unit 117 may generate the first fire severity message indicating that the fire severity is 'high and transmit the first fire severity message to the control system 140.

As such, when the control system 140 receives the first fire severity message from the fire detection apparatus 110, a manager may take a measure corresponding to a fire severity level (high) by referring to the first fire severity message received by the control system 140.

According to an exemplary embodiment of the present invention, the fire detection apparatus 110 may further include a sensor diagnosis event generation unit 118, a collection unit 119, a dispersion computing unit 120, a dispersion confirmation unit 121, a second output unit 122, and a sensor inspection message transmission unit 123.

The sensor diagnosis event generation unit 118 generates a sensor diagnosis event for diagnosing the temperature sensor and the second smoke sensor at a predetermined sensor diagnosis cycle interval.

The collection unit 119 collects n (n is a natural number of 2 or more) temperature measurement values and n smoke concentration measurement values currently measured through the temperature sensor and the second smoke sensor at a predetermined collection cycle interval when the sensor diagnosis event is generated.

The dispersion computing unit 120 computes a first dispersion of the n temperature measurement values and a second dispersion of the n smoke concentration measurement values when the n temperature measurement values and the n smoke concentration measurement values are collected.

Here, as the first dispersion and the second dispersion, a variance or a standard deviation may be utilized.

When the first dispersion and the second dispersion are computed, the dispersion confirmation unit 121 may confirm whether the first dispersion is included a first threshold range and the second dispersion is included in a second threshold range.

When it is confirmed that the first dispersion is not included in the first threshold range or it is confirmed that the second dispersion is not included in the second threshold range, the second output unit 122 outputs a second indication signal for announcing a sensor abnormality through the signal indicator.

The sensor inspection message transmission unit 123 generates a temperature sensor inspection message for indicating inspection of the temperature sensor and transmits the temperature sensor inspection message to the control system 140 when it is confirmed that the first dispersion is not included in the first threshold range, and generates a smoke sensor inspection message for indicating inspection of the second smoke sensor and transmits the smoke sensor inspection message to the control system 140 when it is confirmed that the second dispersion is not included in the second threshold range.

Hereinafter, the operations of the sensor diagnosis event generation unit 118, the collection unit 119, the dispersion computing unit 120, the dispersion confirmation unit 121, the second output unit 122, and the sensor inspection message transmission unit 123 will be described in detail, for example.

First, when a predetermined sensor diagnosis cycle is '2 hours', a predetermined collection cycle is '10 minutes', and 'n=5', the sensor diagnosis event generation unit 118 may generate sensor diagnosis events for diagnosing the temperature sensor and the second smoke sensor at an interval of '2 hours' which is the predetermined sensor diagnosis cycle.

In this case, when the sensor diagnosis event is generated by the sensor diagnosis event generation unit 118 at a specific time point, the collection unit 119 may collect five temperature measurement values and five smoke concentration measurement values currently measured through the temperature sensor and the second smoke sensor at an interval of '10 minutes' which is a predetermined collection cycle.

When it is assumed that the five temperature measurement values collected by the collection unit 119 are '36 degrees Celsius, 37 degrees Celsius, 38 degrees Celsius, 37 degrees Celsius, and 37.5 degrees Celsius', and the five smoke concentration measurement values collected by collection unit 119 are '5 $mg/m^3$, 25 $mg/m^3$, 6 $mg/m^3$, 28 $mg/m^3$, 4 $mg/m^3$', the dispersion computing unit 120 may compute a first dispersion of '36 degrees Celsius, 37 degrees Celsius, 38 degrees Celsius, 37 degrees Celsius, and 37.5 degrees Celsius' which are the five temperature measurement values as '$D_1$' and compute a second dispersion of '5 $mg/m^3$, 25 $mg/m^3$, 6 $mg/m^3$, 28 $mg/m^3$, 4 $mg/m^3$' which are the five smoke concentration measurement values as '$D_2$'.

As such, when the dispersion computing unit 120 computes the first dispersion and the second dispersion, the dispersion confirmation unit 121 may confirm whether 'D1' which is the first dispersion is included in the first threshold range and 'D2' which is the second dispersion is included in the second threshold range.

Here, when the dispersion confirmation unit 121 confirms that 'D2' which is the second dispersion is not included in the second threshold range while confirming that 'D1' which is the first dispersion is included in the first threshold range, the second output unit 122 may output a second indication signal for announcing the sensor abnormality through the signal indicator 211.

In this case, when it is assumed that the second indication signal for announcing the sensor abnormality is a 'yellow signal', the second output unit 122 flashes the LED module constituting the signal indicator 211 to output the 'yellow signal' which is the second indication signal for announcing the sensor abnormality.

Since it is confirmed that 'D2' which is the second dispersion is not included in the second threshold range, the sensor inspection message transmission unit 123 may generate the smoke sensor inspection message for indicating inspection of the second smoke sensor and transmit the smoke sensor inspection message to the control system 140.

As such when the control system 140 receives the smoke sensor inspection message from the fire detection apparatus 110, the manager may confirm the smoke sensor inspection message received by the control system 140.

According to an exemplary embodiment of the present invention, the fire detection apparatus 110 may further include a detailed inspection event generation unit 124, an abnormality judgment unit 125, and a sensor abnormality message transmission unit 126.

When detailed inspection request instructions for the temperature sensor and the second smoke sensor are received while the temperature sensor inspection message or the smoke sensor inspection message is generated and transmitted to the control system 140 through the sensor inspection message transmission unit 123, and then n reference temperature measurement values (the n reference temperature measurement values are temperature measurement values measured at the collection cycle interval through a predesignated normal temperature sensor) and n reference smoke concentration measurement values (the n reference smoke concentration measurement values are smoke concentration measurement values measured at the collection cycle interval through a predesignated normal smoke sensor) are received from the control system 140, the detailed inspection event generation unit 124 generates detailed inspection events for detailed inspection of the temperature sensor and the second smoke sensor.

When the detailed inspection event occurs, the abnormality judgment unit 125 computes a first cosine similarity and a first mean squared error between a set constituted by the n temperature measurement values and a set constituted by the n reference temperature measurement values, and then judges that the first cosine similarity is less than a predetermined first reference cosine similarity or judges that the first mean squared error exceeds a predetermined first reference mean squared error, the abnormality judgment unit 125 judges that the temperature sensor is abnormal, when the abnormality judgment unit 125 computes a second cosine similarity and a second mean squared error between a set constituted by the n smoke concentration measurement values and a set constituted by the n reference smoke concentration measurement values, and then judges that the second cosine similarity is less than a predetermined second reference cosine similarity or judges that the second mean squared error exceeds a predetermined second reference mean squared error, the abnormality judgment unit 125 judges that the second smoke sensor is abnormal.

The sensor abnormality message transmission unit 126 generates a temperature sensor abnormality message for indicating that the temperature sensor is abnormal and transmits the temperature sensor abnormality message to the control system 140 when it is judged that the temperature sensor is abnormal, and generates a smoke sensor abnormality message for indicating that the second smoke sensor is abnormal and transmits the smoke sensor abnormality message to the control system 140 when it is judged that the second smoke sensor is abnormal.

Hereinafter, the operations of the detailed inspection event generation unit 124, the abnormality judgment unit 125, and the sensor abnormality message transmission unit 126 will be described in detail, for example.

First, as in the above-described example, it is assumed that 'n=5', the collection cycle is '10 minutes', and the smoke sensor inspection message is generated and transmitted to the control system 140 through the sensor inspection message transmission unit 123.

In this case, when the detailed inspection request instructions the temperature sensor and the second smoke sensor are received while five reference temperature measurement values (the five reference temperature measurement values are temperature measurement values measured at the interval of '10 minutes' which is the collection cycle through a predesignated normal temperature sensor) such as '36.5 degrees Celsius, 37.3 degrees Celsius, 37.5 degrees Celsius, 37.2 degrees Celsius, and 38 degrees Celsius' in the fire detection apparatus 110 from the control system 140 and five reference smoke concentration measurement values (the five reference smoke concentration measurement values are smoke concentration measurement values measured at the interval of '10 minutes' which is the collection cycle through a predesignated normal smoke sensor) such as '4.5 $mg/m^3$, 4 $mg/m^3$, 6 $mg/m^3$, 5 $mg/m^3$, and 4.1 $mg/m^3$' received the detailed inspection event generation unit 124 may generate detailed inspection events for detailed inspection of the temperature sensor and the second smoke sensor.

As such, when the detailed inspection event generation unit 124 generates the detailed inspection event, the abnormality judgment unit 125 may compute a first cosine similarity and a first mean squared error between '{36, 37, 38, 37, 37.5}' which is a set constituted by '36 degrees Celsius, 37 degrees Celsius, 38 degrees Celsius, 37 degrees Celsius, and 37.5 degrees Celsius' which are the five temperature measurement values and '{36.5, 37.3, 37.5, 37.2, 38}' which is a set constituted by '36.5 degrees Celsius, 37.3 degrees Celsius, 37.5 degrees Celsius, 37.2 degrees Celsius, and 38 degrees Celsius' which are the five reference temperature measurement values as '$CS_1$' and '$MSE_1$', respectively.

At the same time, the abnormality judgment unit 125 may compute a second cosine similarity and a second mean squared error between '{5, 25, 6, 28, 4}' which is a set constituted by '5 $mg/m^3$, 25 $mg/m^3$, 6 $mg/m^3$, 28 $mg/m^3$, and 4 $mg/m^3$' which are the five smoke concentration measurement values and '{4.5, 4, 6, 5, 4.1}' which is a set constituted by '4.5 $mg/m^3$, 4 $mg/m^3$, 6 $mg/m^3$, 5 $mg/m^3$, and 4.1 $mg/m^3$' which are the five reference smoke concentration measurement values as '$CS_2$' and '$MSE_2$', respectively.

Thereafter, when the abnormality judgment unit 125 compares '$CS_1$' which is the first cosine similarity and a predetermined first reference cosine similarity with each other, and compares '$MSE_1$' which is the first mean squared error and a predetermined first reference mean squared error with each other, and judges that '$CS_1$' which is the first cosine similarity is less than the first reference cosine similarity or judges that '$MSE_1$' which is the first mean squared error exceeds the first reference mean squared error, the abnormality judgment unit 125 may judge that the temperature sensor is abnormal.

At the same time, when the abnormality judgment unit 125 compares '$CS_2$' which is the second cosine similarity and a predetermined second reference cosine similarity with each other, and compares '$MSE_2$' which is the second mean squared error and a predetermined second reference mean squared error with each other, and judges that '$CS_2$' which is the second cosine similarity is less than the second reference cosine similarity or judges that '$MSE_2$' which is the second mean squared error exceeds the second reference mean squared error, the abnormality judgment unit 125 may judge that the second smoke sensor is abnormal.

In this regard, when the abnormality judgment unit 125 compares 'CS1' which is the first cosine similarity and the first reference cosine similarity with each other, and as a result of comparing '$MSE_1$' which is the first mean squared error and the first reference mean squared error with each other, and judges that 'CS1' which is the first cosine similarity is not less than the first reference cosine similarity or at the same time, judges that '$MSE_1$' which is the first mean squared error not exceeds the first reference mean squared error, the abnormality judgment unit 125 may judge that the temperature sensor is not abnormal.

However, when the abnormality judgment unit 125 compares 'CS2' which is the second cosine similarity and the second reference cosine similarity with each other, and result compares '$MSE_2$' which is the second mean squared error and the second reference mean squared error with each other, and judges that 'CS2' which is the second cosine similarity is less than the second reference cosine similarity orjudges that '$MSE_2$' which is the second mean squared error exceeds the second reference mean squared error, the abnormality judgment unit 125 may judge that the second smoke sensor is abnormal.

As such, when it is judged that the second smoke sensor is abnormal, the sensor abnormality message transmission unit 126 may generate a smoke sensor abnormality message for indicating that the second smoke sensor is abnormal and transmit the smoke sensor abnormality message to the control system 140.

As such, when the control system 140 receives the smoke sensor abnormality message from the fire detection apparatus 110, the manager may confirm the smoke sensor abnormality message received by the control system 140, and then perform the detailed inspection for the second smoke sensor.

According to an exemplary embodiment of the present invention, the fire detection apparatus 110 may further include a communication diagnosis event generation unit 127, a reception confirmation unit 128, a third output unit 129, and a communication state inspection message transmission unit 130.

The communication diagnosis event generation unit 127 generates a communication state diagnosis event for diagnosing a communication state with the control system 140 at a predetermined communication state diagnosis cycle interval.

When the communication state diagnosis event is generated, the reception confirmation unit 128 transmits a test signal to the control system 140, and then confirms whether a response signal to the test signal is received from the control system 140.

When the third output unit 129 does not receive the response signal from the control system 140 within a predetermined waiting time, the third output unit 129 outputs a third indication signal for announcing a communication state abnormality through the signal indicator.

When the third indication signal is output through the signal indicator, the communication state inspection message transmission unit 130 generates a communication state inspection message for indicating inspection of the communication state with the control system 140 and transmits the communication state inspection message to a predesignated manager terminal 150.

Hereinafter, the operations of the communication diagnosis event generation unit 127, reception confirmation unit 128, the third output unit 129, and the communication state inspection message transmission unit 130 will be described in detail, for example.

First, when a predetermined communication state diagnosis cycle is '1 hour' and a predetermined waiting time is '2 minutes', the communication diagnosis event generation unit 127 may generate the communication state diagnosis event for diagnosing the communication state with the control system 140 at the interval of '1 hour' which is the predetermined communication state diagnosis cycle.

In this case, when the communication diagnosis event generation unit 127 generates the communication state diagnosis event at a specific time point, the reception confirmation unit 128 may transmit the test signal to the control system 140.

Thereafter, the reception confirmation unit 128 may confirm whether the response signal to the test signal is received from the control system 140.

In this case, when the fire detection apparatus 110 does not receive the response signal from the control system 140 within '2 minutes' which is the predetermined waiting time, the third output unit 129 may output the third indication signal for announcing the communication state abnormality through the signal indicator 211.

Here, when it is assumed that the third indication signal for announcing the communication state abnormality is an 'orange signal', the third output unit 129 flashes the LED module constituting the signal indicator 211 to output the 'orange signal' which is the third indication signal for announcing the communication state abnormality.

As such, when the 'orange signal' is output through the signal indicator 211, the communication state inspection message transmission unit 130 may generate a communications state inspection message for indicating inspection of the communication state with the control system 140 and transmit the communication state inspection message to the predesignated manager terminal 150.

As such, when the manager terminal 150 receives the communication state inspection message from the fire detection apparatus 110, the manager may confirm the communication state inspection message received by the manager terminal 150, and then inspect the communication state between the fire detection apparatus 110 and the control system 140.

Figure 3:
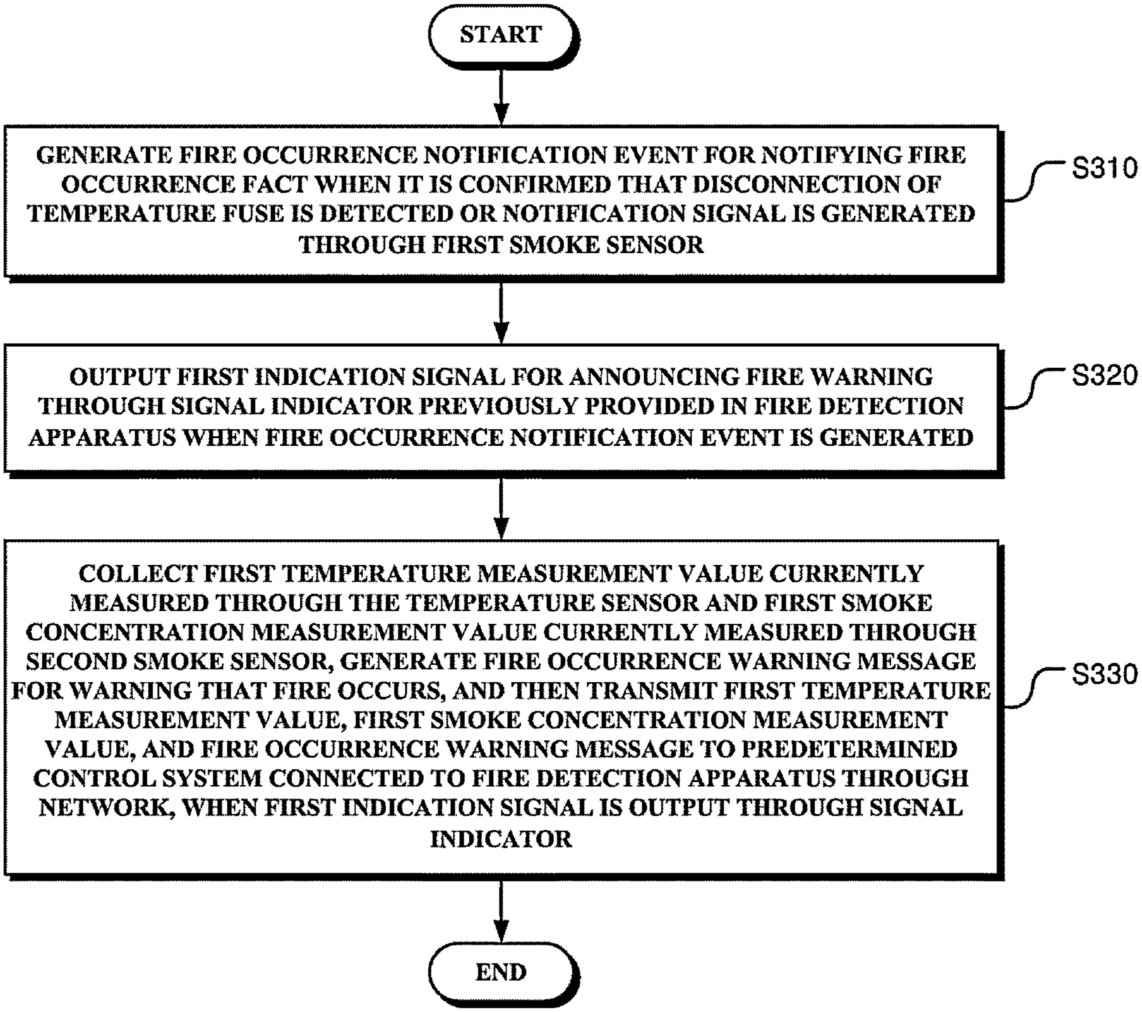
FIG. 3 is a flowchart illustrating an operating method of the fire detection apparatus using multiple sensors according to an exemplary embodiment of the present invention.

FIG. 3 is a flowchart illustrating an operating method of a fire detection apparatus including a temperature fuse designed to be disconnected when a temperature exceeds a predetermined reference temperature, a temperature sensor detecting the temperature and generating a temperature measurement value, a first smoke sensor detecting a smoke and generating a notification signal when a current smoke concentration exceeds a predetermined smoke concentration threshold, and a second smoke sensor detecting the smoke and generating the smoke concentration measurement value according to an exemplary embodiment of the present invention.

In step S310, a fire occurrence notification event for notifying a fire occurrence fact is generated when it is confirmed that the disconnection of the temperature fuse is detected or the notification signal is generated through the first smoke sensor.

In step S320, a first indication signal for announcing a fire warning is output through a signal indicator previously provided in the fire detection apparatus when the fire occurrence notification event is generated.

In step S330, a first temperature measurement value currently measured through the temperature sensor and a first smoke concentration measurement value currently measured through the second smoke sensor are collected, a fire occurrence warning message for warning that the fire occurs is generated, and then the first temperature measurement value, the first smoke concentration measurement value, and the fire occurrence warning message are transmitted to a predetermined control system connected to the fire detection apparatus through a network, when the first indication signal is output through the signal indicator.

In this case, according to an exemplary embodiment of the present invention, the operating method of the fire detection apparatus may further include: when the first temperature measurement value, the first smoke concentration measurement value, and the fire occurrence warning message are transmitted through the control system, generating a fire severity judgment event for judging a fire severity; when the fire severity judgment event is generated, generating a 3-dimensional judgment vector constituted by a first component (the first component is a component which is designated to a predesignated first numerical value and when the disconnection of the temperature fuse is detected and '0' when the disconnection of the temperature fuse is not detected) for indicating whether the disconnection of the temperature fuse is detected, a second component (the second component is a component which is designated to a predesignated second numerical value when the notification signal is generated and '0' when the notification signal is not generated) for indicating whether the notification signal is generated, and a third component (the third component is a component which is designated to a predesignated third numerical value when the disconnection of the temperature fuse is detected and simultaneously, the notification signal is generated and '0' when the disconnection of the temperature fuse is not detected or the notification signal is not generated) for indicating whether the disconnection of the temperature fuse is detected and simultaneously, whether the notification signal is generated; when the judgment vector is generated, computing a Manhattan norm of the judgment vector; and generating a first fire severity message indicting that the fire severity is 'high' and transmits the first fire severity message to the control system when the Manhattan norm of the judgment vector matches a predetermined first reference value indicating that the fire severity is 'high', generating a second fire severity message indicating that the fire severity is 'normal' and transmitting the second fire severity message to the control system when the Manhattan norm of the judgment vector matches a predetermined second reference value indicating that the fire severity is 'normal', and generating a third fire severity message indicating that the fire severity is 'low' and transmitting the third fire severity message to the control system when the Manhattan norm of the judgment vector matches a predetermined third reference value indicating that the fire severity is 'low'.

According to an exemplary embodiment of the present invention, the operating method of the fire detection apparatus may further include: generating a sensor diagnosis event for diagnosing the temperature sensor and the second smoke sensor at a predetermined sensor diagnosis cycle interval; collecting n (n is a natural number of 2 or more) temperature measurement values and n smoke concentration measurement values currently measured through the temperature sensor and the second smoke sensor at a predetermined collection cycle interval when the sensor diagnosis event is generated; computing a first dispersion of the n temperature measurement values and a second dispersion of the n smoke concentration measurement values when the n temperature measurement values and the n smoke concentration measurement values are collected; when the first dispersion and the second dispersion are computed, confirming whether the first dispersion is included a first threshold range and the second dispersion is included in a second threshold range; when it is confirmed that the first dispersion is not included in the first threshold range or it is confirmed that the second dispersion is not included in the second threshold range, outputting a second indication signal for announcing a sensor abnormality through the signal indicator; and generating a temperature sensor inspection message for indicating inspection of the temperature sensor and transmitting the temperature sensor inspection message to the control system when it is confirmed that the first dispersion is not included in the first threshold range, and generating a smoke sensor inspection message for indicating inspection of the second smoke sensor and transmitting the smoke sensor inspection message to the control system when it is confirmed that the second dispersion is not included in the second threshold range.

In this case, according to an exemplary embodiment of the present invention, the operating method of the fire detection apparatus may further include: when detailed inspection request instructions for the temperature sensor and the second smoke sensor are received while the temperature sensor inspection message or the smoke sensor inspection message is generated and transmitted to the control system, and then n reference temperature measurement values (the n reference temperature measurement values are temperature measurement values measured at the collection cycle interval through a predesignated normal temperature sensor) and n reference smoke concentration measurement values (the n reference smoke concentration measurement values are smoke concentration measurement values measured at the collection cycle interval through a predesignated normal smoke sensor) are received from the control system, generating detailed inspection events for detailed inspection of the temperature sensor and the second smoke sensor; when the detailed inspection event occurs, computing a first cosine similarity and a first mean squared error between a set constituted by the n temperature measurement values and a set constituted by the n reference temperature measurement values, and then judging that the first cosine similarity is less than a predetermined first reference cosine similarity or judging that the first mean squared error exceeds a predetermined first reference mean squared error, judging that the temperature sensor is abnormal, when computing a second cosine similarity and a second mean squared error between a set constituted by the n smoke concentration measurement values and a set constituted by the n reference smoke concentration measurement values, and then judging that the second cosine similarity is less than a predetermined second reference cosine similarity orjudges that the second mean squared error exceeds a predetermined second reference mean squared error, judging that the second smoke sensor is abnormal; and generating a temperature sensor abnormality message for indicating that the temperature sensor is abnormal and transmitting the temperature sensor abnormality message to the control system when it is judged that the temperature sensor is abnormal, and generating a smoke sensor abnormality message for indicating that the second smoke sensor is abnormal and transmitting the smoke sensor abnormality message to the control system when it is judged that the second smoke sensor is abnormal.

According to an exemplary embodiment of the present invention, the operating method of the fire detection apparatus may further include: generating a communication state diagnosis event for diagnosing a communication state with the control system at a predetermined communication state diagnosis cycle interval; when the communication state diagnosis event is generated, transmitting a test signal to the control system, and then confirming whether a response signal to the test signal is received from the control system; when not receiving the response signal from the control system within a predetermined waiting time, outputting a third indication signal for announcing a communication state abnormality through the signal indicator; and when the third indication signal is output through the signal indicator, generating a communication state inspection message for indicating inspection of the communication state with the control system and transmitting the communication state inspection message to a predesignated manager terminal.

Hereinabove the operating method of the fire detection apparatus according to an exemplary embodiment of the present invention is described with reference to FIG. 3. Herein, since the operating method of the fire detection apparatus according to an exemplary embodiment of the present invention may correspond to a configuration for an operation of the fire detection apparatus 110, which is described by using FIGS. 1 and 2, a more detailed description thereof will be omitted.

The operating method of the fire detection apparatus by using multiple sensors according to an exemplary embodiment of the present invention may be implemented by a computer program stored in a storage medium for executing the computer program through coupling with a computer.

Meanwhile, the operating method of the fire detection apparatus by using multiple sensors according to an exemplary embodiment of the present invention is implemented in a form of a program command which may be performed through various computer means and may be recorded in the computer readable medium. The computer readable medium may include a program command, a data file, a data structure, etc., singly or combinationally. The program command recorded in the medium may be specially designed and configured for the present invention, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

What is claimed is:

1. A fire detection apparatus including a temperature fuse designed to be disconnected when a temperature exceeds a predetermined reference temperature, a temperature sensor detecting the temperature and generating a temperature measurement value, a first smoke sensor detecting a smoke and generating a notification signal when a current smoke concentration exceeds a predetermined smoke concentration threshold, and a second smoke sensor detecting the smoke and generating the smoke concentration measurement value, the fire detection apparatus comprising a processor configured to:

generate a fire occurrence notification event for notifying a fire occurrence fact when it is confirmed that the disconnection of the temperature fuse is detected or the notification signal is generated through the first smoke sensor;

output a first indication signal for announcing a fire warning through a signal indicator previously provided in the fire detection apparatus when the fire occurrence notification event is generated; and collect a first temperature measurement value currently measured through the temperature sensor and a first smoke concentration measurement value currently measured through the second smoke sensor, generate a fire occurrence warning message for warning that the fire occurs, and transmit the first temperature measurement value, the first smoke concentration measurement value, and the fire occurrence warning message to a predetermined control system connected to the fire detection apparatus through a network, when the first indication signal is output through the signal indicator.

2. The fire detection apparatus of claim 1, wherein the processor is further configured to:

when the first temperature measurement value, the first smoke concentration measurement value, and the fire occurrence warning message are transmitted through the control system, generate a fire severity judgment event for judging a fire severity;

when the fire severity judgment event is generated, generate a 3-dimensional judgment vector constituted by a first component (the first component is a component which is designated to a predesignated first numerical value and when the disconnection of the temperature fuse is detected and '0' when the disconnection of the temperature fuse is not detected) for indicating whether the disconnection of the temperature fuse is detected, a second component (the second component is a component which is designated to a predesignated second numerical value when the notification signal is generated and '0' when the notification signal is not generated) for indicating whether the notification signal is generated, and a third component (the third component is a component which is designated to a predesignated third numerical value when the disconnection of the temperature fuse is detected and simultaneously, the notification signal is generated and '0' when the disconnection of the temperature fuse is not detected or the notification signal is not generated) for indicating whether the disconnection of the temperature fuse is detected and simultaneously, whether the notification signal is generated;

when the judgment vector is generated, compute a Manhattan norm of the judgment vector; and generate a first fire severity message indicting that the fire severity is 'high' and transmits the first fire severity message to the control system when the Manhattan norm of the judgment vector matches a predetermined first reference value indicating that the fire severity is 'high', generate a second fire severity message indicating that the fire severity is 'normal' and transmitting the second fire severity message to the control system when the Manhattan norm of the judgment vector matches a predetermined second reference value indicating that the fire severity is 'normal', and generate a third fire severity message indicating that the fire severity is 'low' and transmitting the third fire severity message to the control system when the Manhattan norm of the judgment vector matches a predetermined third reference value indicating that the fire severity is 'low'.

3. The fire detection apparatus of claim 1, wherein the processor is further configured to:

generate a sensor diagnosis event for diagnosing the temperature sensor and the second smoke sensor at a predetermined sensor diagnosis cycle interval;

collect n (n is a natural number of 2 or more) temperature measurement values and n smoke concentration measurement values currently measured through the temperature sensor and the second smoke sensor at a predetermined collection cycle interval when the sensor diagnosis event is generated;

compute a first dispersion of the n temperature measurement values and a second dispersion of the n smoke concentration measurement values when the n temperature measurement values and the n smoke concentration measurement values are collected;

when the first dispersion and the second dispersion are computed, confirm whether the first dispersion is included a first threshold range and the second dispersion is included in a second threshold range;

when it is confirmed that the first dispersion is not included in the first threshold range or it is confirmed that the second dispersion is not included in the second threshold range, output a second indication signal for announcing a sensor abnormality through the signal indicator; and generate a temperature sensor inspection message for indicating inspection of the temperature sensor and transmit the temperature sensor inspection message to the control system when it is confirmed that the first dispersion is not included in the first threshold range; and generate a smoke sensor inspection message for indicating inspection of the second smoke sensor and transmit the smoke sensor inspection message to the control system when it is confirmed that the second dispersion is not included in the second threshold range.

4. The fire detection apparatus of claim 3, wherein the processor in further configured to:

when detailed inspection request instructions for the temperature sensor and the second smoke sensor are received while the temperature sensor inspection message or the smoke sensor inspection message is generated and transmitted to the control system, and n reference temperature measurement values (the n reference temperature measurement values are temperature measurement values measured at the collection cycle interval through a predesignated normal temperature sensor) and n reference smoke concentration measurement values (the n reference smoke concentration measurement values are smoke concentration measurement values measured at the collection cycle interval through a predesignated normal smoke sensor) are received from the control system, generate detailed inspection events for detailed inspection of the temperature sensor and the second smoke sensor;

compute a first cosine similarity and a first mean squared error between a set constituted by the n temperature measurement values and a set constituted by the n reference temperature measurement values;

when the first cosine similarity is less than a predetermined first reference cosine similarity or the first mean squared error exceeds a predetermined first reference mean squared error, judge that the temperature sensor is abnormal;

compute a second cosine similarity and a second mean squared error between a set constituted by the n smoke concentration measurement values and a set constituted by the n reference smoke concentration measurement values;

when the second cosine similarity is less than a predetermined second reference cosine similarity or the second mean squared error exceeds a predetermined second reference mean squared error, judge that the second smoke sensor is abnormal;

generate a temperature sensor abnormality message for indicating that the temperature sensor is abnormal and transmit the temperature sensor abnormality message to the control system when it is judged that the temperature sensor is abnormal; and generate a smoke sensor abnormality message for indicating that the second smoke sensor is abnormal and transmit the smoke sensor abnormality message to the control system when it is judged that the second smoke sensor is abnormal.

5. The fire detection apparatus of claim 1, wherein the processor is further configured to:

generate a communication state diagnosis event for diagnosing a communication state with the control system at a predetermined communication state diagnosis cycle interval;

when the communication state diagnosis event is generated, transmit a test signal to the control system, and confirm whether a response signal to the test signal is received from the control system;

when not receiving the response signal from the control system within a predetermined waiting time, output a third indication signal for announcing a communication state abnormality through the signal indicator; and when the third indication signal is output through the signal indicator, generate a communication state inspection message for indicating inspection of the communication state with the control system and transmit the communication state inspection message to a predesignated manager terminal.

6. An operating method of a fire detection apparatus including a temperature fuse designed to be disconnected when a temperature exceeds a predetermined reference temperature, a temperature sensor detecting the temperature and generating a temperature measurement value, a first smoke sensor detecting a smoke and generating a notification signal when a current smoke concentration exceeds a predetermined smoke concentration threshold, and a second smoke sensor detecting the smoke and generating the smoke concentration measurement value, the operating method comprising:

generating a fire occurrence notification event for notifying a fire occurrence fact when it is confirmed that the disconnection of the temperature fuse is detected or the notification signal is generated through the first smoke sensor;

outputting a first indication signal for announcing a fire warning through a signal indicator previously provided in the fire detection apparatus when the fire occurrence notification event is generated; and collecting a first temperature measurement value currently measured through the temperature sensor and a first smoke concentration measurement value currently measured through the second smoke sensor, generating a fire occurrence warning message for warning that the fire occurs, and transmitting the first temperature measurement value, the first smoke concentration measurement value, and the fire occurrence warning message to a predetermined control system connected to the fire detection apparatus through a network, when the first indication signal is output through the signal indicator.

7. The operating method of claim 6, further comprising:

when the first temperature measurement value, the first smoke concentration measurement value, and the fire occurrence warning message are transmitted through the control system, generating a fire severity judgment event for judging a fire severity;

when the fire severity judgment event is generated, generating a 3-dimensional judgment vector constituted by a first component (the first component is a component which is designated to a predesignated first numerical value and when the disconnection of the temperature fuse is detected and '0' when the disconnection of the temperature fuse is not detected) for indicating whether the disconnection of the temperature fuse is detected, a second component (the second component is a component which is designated to a predesignated second numerical value when the notification signal is generated and '0' when the notification signal is not generated) for indicating whether the notification signal is generated, and a third component (the third component is a component which is designated to a predesignated third numerical value when the disconnection of the temperature fuse is detected and simultaneously, the notification signal is generated and '0' when the disconnection of the temperature fuse is not detected or the notification signal is not generated) for indicating whether the disconnection of the temperature fuse is detected and simultaneously, whether the notification signal is generated;

when the judgment vector is generated, computing a Manhattan norm of the judgment vector; and generating a first fire severity message indicting that the fire severity is 'high' and transmits the first fire severity message to the control system when the Manhattan norm of the judgment vector matches a predetermined first reference value indicating that the fire severity is 'high', generating a second fire severity message indicating that the fire severity is 'normal' and transmitting the second fire severity message to the control system when the Manhattan norm of the judgment vector matches a predetermined second reference value indicating that the fire severity is 'normal', and generating a third fire severity message indicating that the fire severity is 'low' and transmitting the third fire severity message to the control system when the Manhattan norm of the judgment vector matches a predetermined third reference value indicating that the fire severity is 'low'.

8. The operating method of claim 6, further comprising:

generating a sensor diagnosis event for diagnosing the temperature sensor and the second smoke sensor at a predetermined sensor diagnosis cycle interval;

collecting n (n is a natural number of 2 or more) temperature measurement values and n smoke concentration measurement values currently measured through the temperature sensor and the second smoke sensor at a predetermined collection cycle interval when the sensor diagnosis event is generated;

computing a first dispersion of the n temperature measurement values and a second dispersion of the n smoke concentration measurement values when the n temperature measurement values and the n smoke concentration measurement values are collected;

when the first dispersion and the second dispersion are computed, confirming whether the first dispersion is included a first threshold range and the second dispersion is included in a second threshold range;

when it is confirmed that the first dispersion is not included in the first threshold range or it is confirmed that the second dispersion is not included in the second threshold range, outputting a second indication signal for announcing a sensor abnormality through the signal indicator;

generating a temperature sensor inspection message for indicating inspection of the temperature sensor and transmitting the temperature sensor inspection message to the control system when it is confirmed that the first dispersion is not included in the first threshold range; and generating a smoke sensor inspection message for indicating inspection of the second smoke sensor and transmitting the smoke sensor inspection message to the control system when it is confirmed that the second dispersion is not included in the second threshold range.

9. The operating method of claim 8, further comprising:

when detailed inspection request instructions for the temperature sensor and the second smoke sensor are received while the temperature sensor inspection message or the smoke sensor inspection message is generated and transmitted to the control system, and n reference temperature measurement values (the n reference temperature measurement values are temperature measurement values measured at the collection cycle interval through a predesignated normal temperature sensor) and n reference smoke concentration measurement values (the n reference smoke concentration measurement values are smoke concentration measurement values measured at the collection cycle interval through a predesignated normal smoke sensor) are received from the control system, generating detailed inspection events for detailed inspection of the temperature sensor and the second smoke sensor;

computing a first cosine similarity and a first mean squared error between a set constituted by the n temperature measurement values and a set constituted by the n reference temperature measurement values;

when the first cosine similarity is less than a predetermined first reference cosine similarity or the first mean squared error exceeds a predetermined first reference mean squared error, judging that the temperature sensor is abnormal;

computing a second cosine similarity and a second mean squared error between a set constituted by the n smoke concentration measurement values and a set constituted by the n reference smoke concentration measurement values;

when the second cosine similarity is less than a predetermined second reference cosine similarity or the second mean squared error exceeds a predetermined second reference mean squared error, judging that the second smoke sensor is abnormal;

generating a temperature sensor abnormality message for indicating that the temperature sensor is abnormal and transmitting the temperature sensor abnormality message to the control system when it is judged that the temperature sensor is abnormal; and generating a smoke sensor abnormality message for indicating that the second smoke sensor is abnormal and transmitting the smoke sensor abnormality message to the control system when it is judged that the second smoke sensor is abnormal.

10. The operating method of claim 6, further comprising:

generating a communication state diagnosis event for diagnosing a communication state with the control system at a predetermined communication state diagnosis cycle interval;

when the communication state diagnosis event is generated, transmitting a test signal to the control system, and confirming whether a response signal to the test signal is received from the control system;

when not receiving the response signal from the control system within a predetermined waiting time, outputting a third indication signal for announcing a communication state abnormality through the signal indicator; and when the third indication signal is output through the signal indicator, generating a communication state inspection message for indicating inspection of the communication state with the control system and transmitting the communication state inspection message to a predesignated manager terminal.

11. A non-transitory computer readable recording medium having a program recorded therein for allowing a computer to execute an operating method of a fire detection apparatus including a temperature fuse designed to be disconnected when a temperature exceeds a predetermined reference temperature, a temperature sensor detecting the temperature and generating a temperature measurement value, a first smoke sensor detecting a smoke and generating a notification signal when a current smoke concentration exceeds a predetermined smoke concentration threshold, and a second smoke sensor detecting the smoke and generating the smoke concentration measurement value, the operating method comprising:

generating a fire occurrence notification event for notifying a fire occurrence fact when it is confirmed that the disconnection of the temperature fuse is detected or the notification signal is generated through the first smoke sensor;

outputting a first indication signal for announcing a fire warning through a signal indicator previously provided in the fire detection apparatus when the fire occurrence notification event is generated; and collecting a first temperature measurement value currently measured through the temperature sensor and a first smoke concentration measurement value currently measured through the second smoke sensor, generating a fire occurrence warning message for warning that the fire occurs, and transmitting the first temperature measurement value, the first smoke concentration measurement value, and the fire occurrence warning message to a predetermined control system connected to the fire detection apparatus through a network, when the first indication signal is output through the signal indicator.

* * * * *